United States Patent
Timm

(10) Patent No.: US 6,374,850 B1
(45) Date of Patent: Apr. 23, 2002

(54) EMERGENCY GAS LINE SHUT-OFF SYSTEM

(76) Inventor: Scott M. Timm, 1622 Central Ave., Summerville, SC (US) 29483

(*) Notice: Subject to any disclaimer, the term of this patent is extended or adjusted under 35 U.S.C. 154(b) by 0 days.

(21) Appl. No.: 09/785,134

(22) Filed: Feb. 16, 2001

(51) Int. Cl.[7] ............................................. F16K 17/36
(52) U.S. Cl. ......................... 137/78.5; 137/39; 137/79; 137/552; 137/559
(58) Field of Search .................. 137/78.5, 38, 39, 137/78.1, 79, 552, 559

(56) References Cited

U.S. PATENT DOCUMENTS

| | | | |
|---|---|---|---|
| 3,714,456 A | | 1/1973 | Krohmer et al. |
| 3,995,651 A | | 12/1976 | Adams |
| 4,091,831 A | | 5/1978 | Pazmany |
| 4,103,697 A | | 8/1978 | Kiesow |
| 4,161,183 A | * | 7/1979 | Berry ........................ 137/39 |
| 4,261,379 A | * | 4/1981 | Berry ........................ 137/39 |
| 4,535,813 A | | 8/1985 | Spain |
| 5,412,616 A | * | 5/1995 | Gonzalez ..................... 367/13 |
| 5,549,130 A | | 8/1996 | Schuster |
| 5,601,108 A | * | 2/1997 | Perry ......................... 137/15 |
| 5,694,960 A | * | 12/1997 | Turk et al. ................... 137/1 |
| 5,722,448 A | * | 3/1998 | Dourado ..................... 137/78.4 |
| 5,826,559 A | * | 10/1998 | Ichimoto et al. ............. 123/295 |
| 6,085,772 A | * | 7/2000 | McGill et al. ................ 137/39 |
| 6,170,509 B1 | * | 1/2001 | Karta ......................... 137/78.4 |

* cited by examiner

Primary Examiner—A. Michael Chambers

(57) ABSTRACT

An emergency gas line shut-off system for automatically preventing a flow of gas into a structure during the detection of emergency conditions. The emergency gas line shut-off system includes a gas valve for mounting on a gas supply line. The gas valve is electrically connected to a central control assembly for controlling the gas valve. The central control assembly preferably comprises control circuitry for determining when the gas valve should be in a closed condition for preventing the flow of gas into a structure. The control circuitry is mounted in a housing and is electrically connected to a detector for detecting a condition requiring the closed condition of the gas valve. The detector may comprise, for example, a smoke detector for detecting smoke, a carbon monoxide detector for detecting carbon monoxide or an earthquake detector for detecting earthquakes.

17 Claims, 4 Drawing Sheets

EMERGENCY GAS LINE SHUT-OFF SYSTEM

BACKGROUND OF THE INVENTION

1. Field of the Invention

The present invention relates to gas line shut-of systems and more particularly pertains to a new emergency gas line shut-off system for automatically preventing a flow of gas into a structure during the detection of emergency conditions.

2. Description of the Prior Art

The use of gas line shut-of systems is known in the prior art. More specifically, gas line shut-of systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 3,714,456; 3,995,651; 4,535,813; 4,103,697; 4,091,831 and 5,549,130.

While these devices fulfill their respective, particular objectives and requirements, the aforementioned patents do not disclose a new emergency gas line shut-off system. The inventive device includes a gas valve for mounting on a gas-supply line. The gas valve is electrically connected to a central control assembly for controlling the gas valve. The central control assembly preferably comprises control circuitry for determining when the gas valve should be in a closed condition for preventing the flow of gas into a structure. The control circuitry is mounted in a housing and is electrically connected to a detector for detecting a condition requiring the closed condition of the gas valve. The detector may comprise, for example, a smoke detector for detecting smoke, a carbon monoxide detector for detecting carbon monoxide or an earthquake detector for detecting earthquakes.

In these respects, the emergency gas line shut-off system according to the present invention substantially departs from the conventional concepts and designs of the prior art, and in so doing provides an apparatus primarily developed for the purpose of automatically preventing a flow of gas into a structure during the detection of emergency conditions.

SUMMARY OF THE INVENTION

In view of the foregoing disadvantages inherent in the known types of gas line shut-of systems now present in the prior art, the present invention provides a new emergency gas line shut-off system construction wherein the same can be utilized for automatically preventing a flow of gas into a structure during the detection of emergency conditions.

The general purpose of the present invention, which will be described subsequently in greater detail, is to provide a new emergency gas line shut-off system apparatus and method which has many of the advantages of the gas line shut-of systems mentioned heretofore and many novel features that result in a new emergency gas line shut-off system which is not anticipated, rendered obvious, suggested, or even implied by any of the prior art gas line shut-of systems, either alone or in any combination thereof.

To attain this, the present invention generally comprises a gas valve for mounting on a gas supply line. The gas valve is electrically connected to a central control assembly for controlling the gas valve. The central control assembly preferably comprises control circuitry for determining when the gas valve should be in a closed condition for preventing the flow of gas into a structure. The control circuitry is mounted in a housing and is electrically connected to a detector for detecting a condition requiring the closed condition of the gas valve. The detector may comprise, for example, a smoke detector for detecting smoke, a carbon monoxide detector for detecting carbon monoxide or an earthquake detector for detecting earthquakes.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new emergency gas line shut-off system apparatus and method which has many of the advantages of the gas line shut-of systems mentioned heretofore and many novel features that result in a new emergency gas line shut-off system which is not anticipated, rendered obvious, suggested, or even implied by any of the prior art gas line shut-of systems, either alone or in any combination thereof.

It is another object of the present invention to provide a new emergency gas line shut-off system which may be easily and efficiently manufactured and marketed.

It is a further object of the present invention to provide a new emergency gas line shut-off system which is of a durable and reliable construction.

An even further object of the present invention is to provide a new emergency gas line shut-off system which is susceptible of a low cost of manufacture with regard to both materials and labor, and which accordingly is then susceptible of low prices of sale to the consuming public, thereby making such emergency gas line shut-off system economically available to the buying public.

Still, yet another object of the present invention is to provide a new emergency gas line shut-off system which provides in the apparatuses and methods of the prior art some of the advantages thereof, while simultaneously overcoming some of the disadvantages normally associated therewith.

Still another object of the present invention is to provide a new emergency gas line shut-off system for automatically preventing a flow of gas into a structure during the detection of emergency conditions.

Yet another object of the present invention is to provide a new emergency gas line shut-off system which includes a gas valve for mounting on a pair of ends of the gas supply line. The gas valve is electrically connected to a central control assembly for controlling the gas valve. The assembly preferably comprises a housing that includes a back wall, a front wall, and a peripheral wall extending between the back and front walls. Control circuitry is provided for determining when the gas valve should be in a closed condition for preventing the flow of gas into a structure. The control circuitry is mounted in the housing and is electrically connected to a detector for detecting a condition requiring the closed condition of the gas valve. The detector may comprise a smoke detector for detecting smoke.

Still yet another object of the present invention is to provide a new emergency gas line shut-off system that can save lives by preventing a flow of gas into a structure damaged by a fire or an earthquake.

Even still another object of the present invention is to provide a new emergency gas line shut-off system that has the potential of saving lives due to a hazardous level of carbon monoxide by automatically shutting off the gas valve and preventing the flow of gas to gas burning appliances that may be generating the carbon monoxide.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
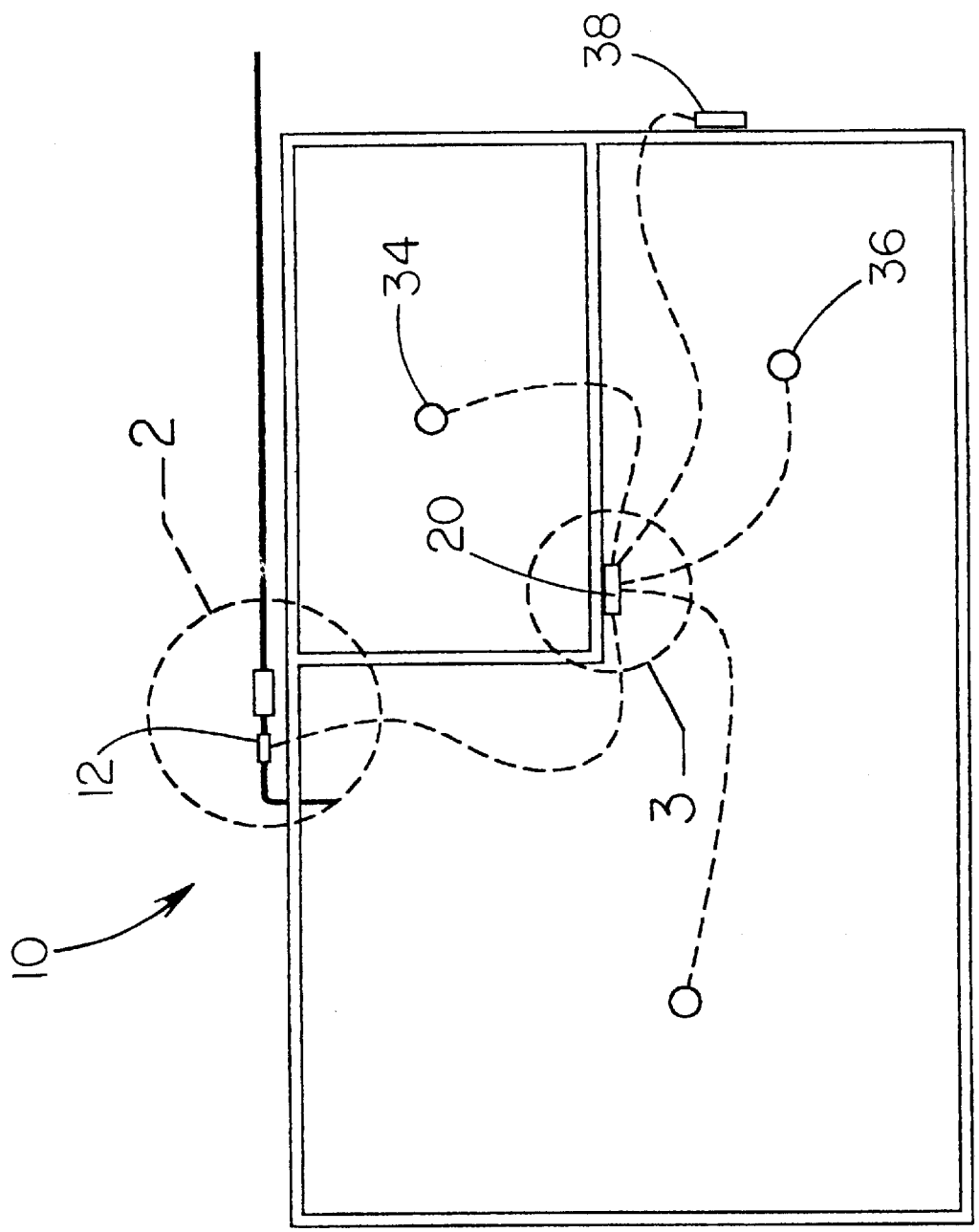
FIG. 1 is a schematic top plan view of a new emergency gas line shut-off system according to the present invention.
Figure 2:
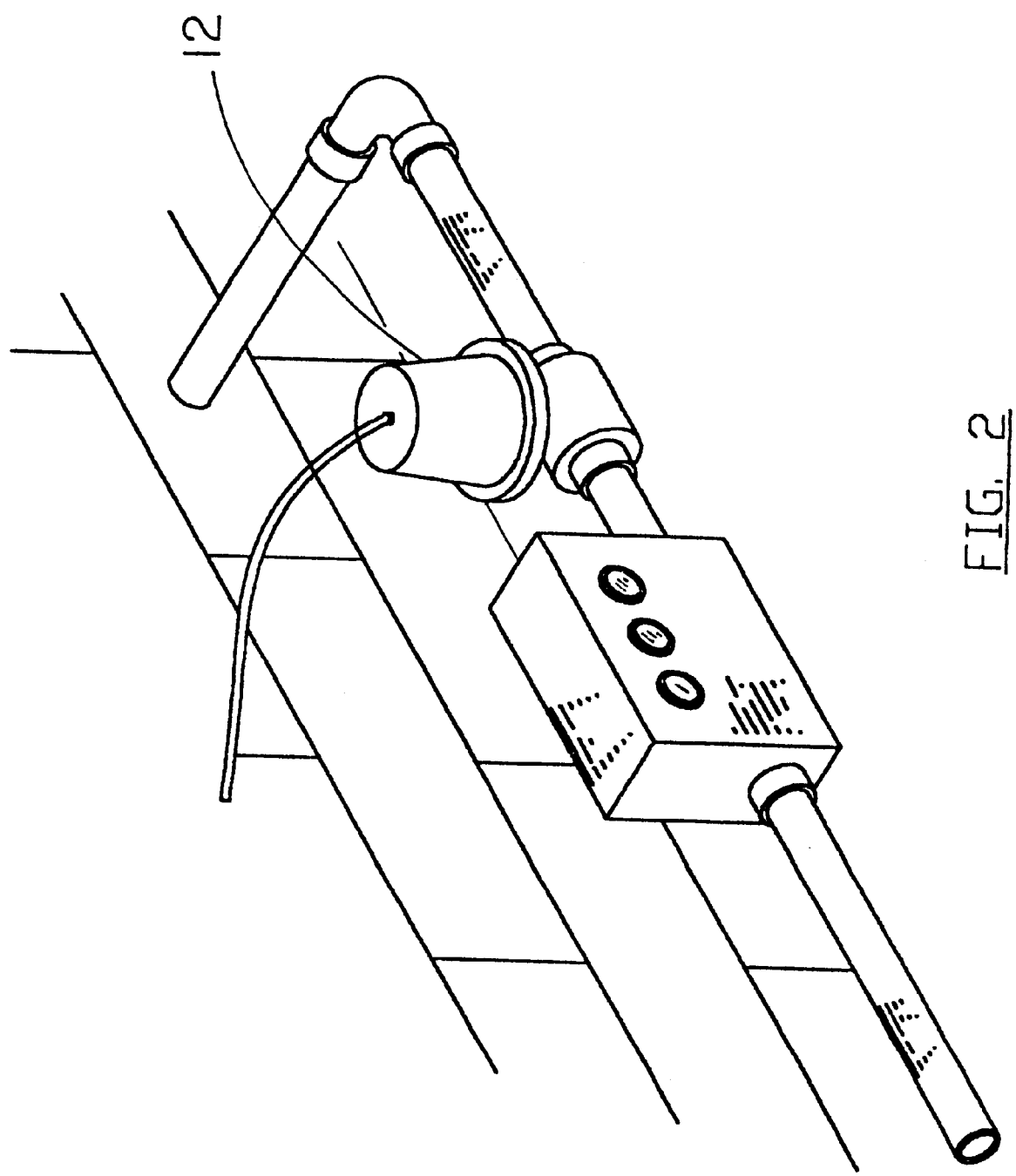
FIG. 2 is a schematic perspective view of the present invention showing a gas shut-off valve fluidly coupled to a pair of ends of a gas supply line.
Figure 3:
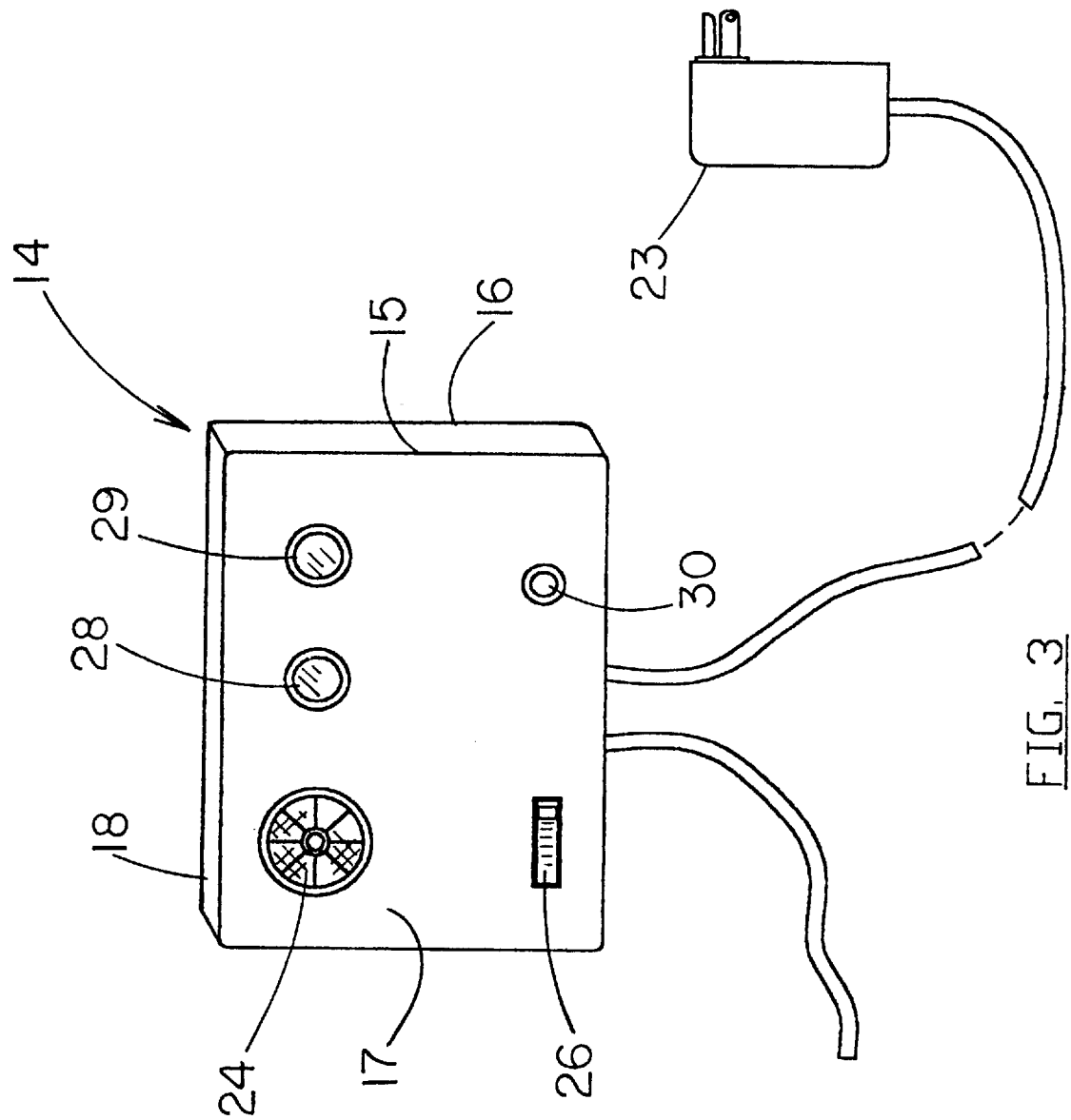
FIG. 3 is a schematic perspective view of the present invention showing a central control assembly for controlling the gas shut-off valve.
Figure 4:
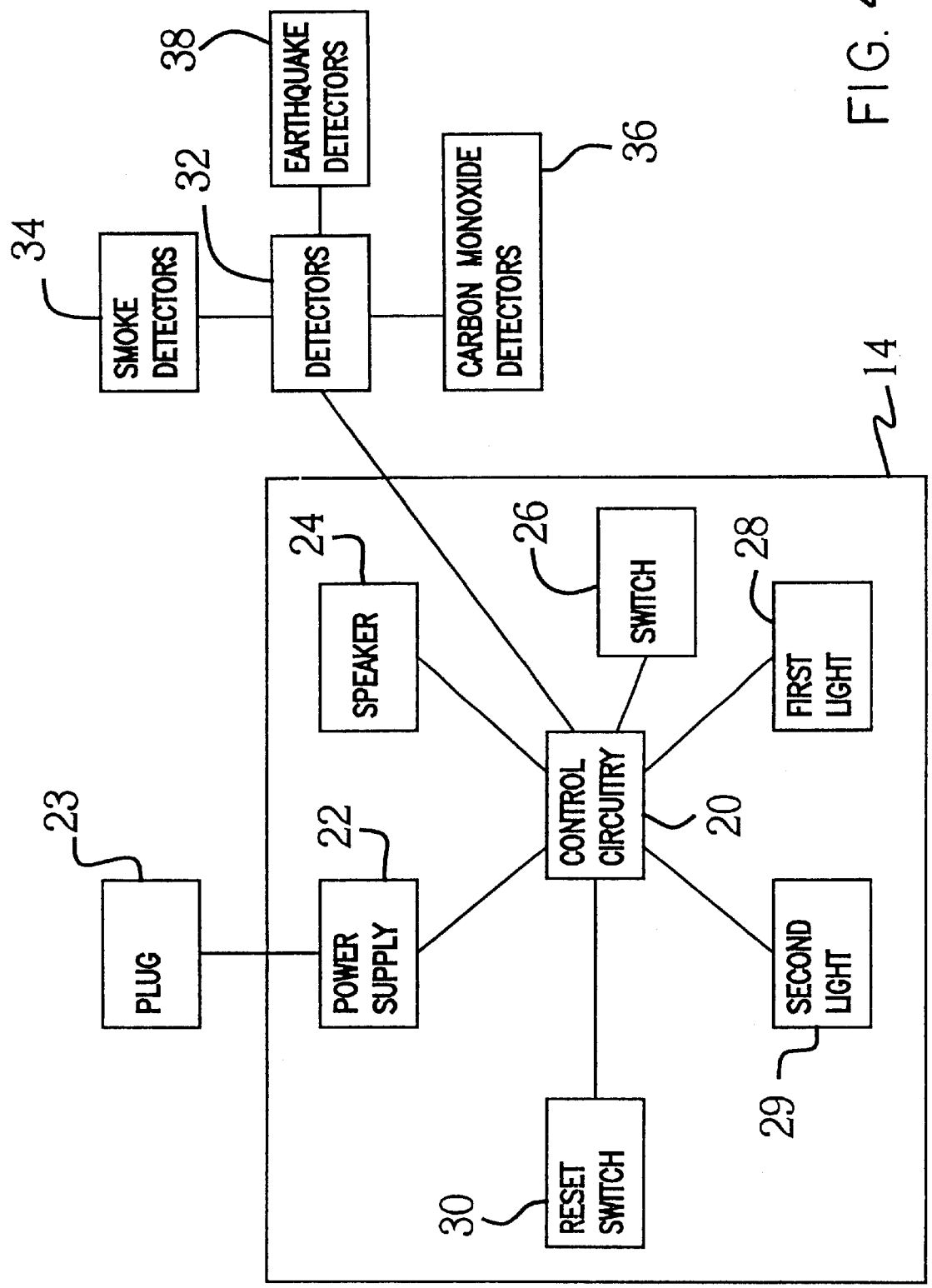
FIG. 4 is a schematic diagram view of the present invention.

With reference now to the drawings, and in particular to FIGS. 1 through 4 thereof, a new emergency gas line shut-off system embodying the principles and concepts of the present invention and generally designated by the reference numeral 10 will be described.

As best illustrated in FIGS. 1 through 4, the emergency gas line shut-off system 10 generally comprises a gas valve 12 for mounting on a pair of ends of a gas supply line. The gas valve 12 includes an open condition and a closed condition. The open condition is characterized by gas being permitted to flow through the valve 12 and into a structure. The closed condition is characterized when gas flow through the gas valve, 12 is prevented. The gas valve 12 may comprise a normally closed 2-way solenoid valve that will close if power supplied to the gas valve 12 is terminated. Other types of known gas valves 12 may also be used to control the flow of gas into a structure.

A central control assembly 14 is provided for controlling the gas valve 12. The central control assembly 14 is mountable in a location of a structure accessible to an individual needing to monitor the assembly 14. The assembly preferably comprises a housing 15 that includes a back wall 16, a front wall 17, and a peripheral wall 18 extending between the back 16 and front walls 17 of the housing 15. The housing 15 may comprise any substantially rigid material such as, for example, a steel or a aluminum material.

Control circuitry 20 is provided for determining when the gas valve 12 should be in the closed condition. The control circuitry 20 is preferably mounted in the housing 15 and is electrically connected to the gas valve 12. The control circuitry 20 would preferably obtain its power supply from a direct connection to the power running into the structure.

An auxiliary power supply 22 may be provided for providing power to the control circuitry 20 when the supply of power running into the structure is terminated. The auxiliary power supply 22 may be mounted in the housing 15 and would be electrically connected to the control circuitry 20. The auxiliary power 22 supply may comprise a rechargeable battery having a plug 213 for recharging the auxiliary power supply 22 when a supply of power is running into the structure.

The control assembly 14 may include a speaker 24 for emitting a sound when the gas valve 12 is in the closed condition. The speaker is preferably mounted on the front wall 17 of the housing 15 and is electrically connected to the control circuitry 20.

A switch 26 may be provided for turning the control circuitry between an ON condition and an OFF condition. The switch 26 is preferably mounted on the housing, 15 and electrically connected to the control circuitry 20.

A first light 28 may be provided for visually alerting an individual of the gas valve 12 being in the closed condition. The first light 28 is preferably mounted on the front wall 17 of the housing 15 and may be positioned generally adjacent to speaker 24. The first light 28 is electrically connected to the control circuitry. The first light 28 may also be mountable in any other location where an individual needing to monitor the control assembly 14 may be located.

A second light 29 may be provided for visually alerting an individual of a loss of a supply of power to the structure and the use of the auxiliary power supply 22 by the control circuitry 20. The second light 29 is preferably mounted on the front wall 17 of the housing 15 and is may be positioned generally adjacent to the first light 28. The second light 29 is electrically connected to the control circuitry 20.

A reset switch 30 may be provided for resetting the gas valve 12 to the open condition after it has been in the closed condition. The reset switch 30 is preferably mounted on the, front wall 17 of the housing 15 and is electrically connected to the control circuitry 20.

As illustrated in FIG. 1, a plurality of detectors 32 are provided for detecting a condition requiring the closed condition of the gas valve 12. Each of the detectors 32 is electrically connected to the control circuitry 20. The plurality of detectors 32 may comprise at least one smoke detector 34 for detecting smoke from a potential fire. The smoke detector 34 is preferably mountable in the structure.

At least one carbon monoxide detector 36 may be provided for detecting a predetermined hazardous level of carbon monoxide in the structure. The carbon monoxide detector 36 is preferably mountable in a location in the structure. The carbon monoxide detector 36 is preferably adjustable for detecting carbon monoxide levels measuring approximately at or above 2 parts per million to over 12,800 parts per million.

An earthquake detector 38 may be provided for detecting a predetermined hazardous level of ground tremors associated with an earthquake. The earthquake detector 38 is preferably mountable on an outer surface of the structure. The earthquake detector 38 may comprise a vibration sensitive mercury switch equipped with a calibration dial. The emergency gas line shut-off system may incorporate any or all of the detectors 32. Other detectors may also be used such as, for example, a detector adapted for measuring a substantial drop in barometric pressure which may indicate adverse weather conditions, such as a hurricane or a tornado.

In use, the gas valve is put in the closed condition when a predetermined hazardous level of one of the detectors 32 is reached.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An emergency gas line shut-off system for terminating a flow of gas in a gas supply line to a structure, said assembly comprising:
    a gas valve for mounting on a gas supply, said gas valve having an open condition wherein the flow of gas is permitted to flow through said valve and into the structure and a closed condition wherein the flow of gas through said gas valve is prevented
    a central control assembly for controlling said gas valve, said assembly including control circuitry for determining when said gas valve should be in a closed condition for preventing the flow of gas; and
    a detector system for detecting a condition requiring said closed condition of said gas valve, said detector system including a smoke detector for detecting smoke, said smoke detector being electrically connected to said control circuitry;
    wherein said control assembly includes a first light for visually alerting an individual of said gas valve being in said closed condition and a second light for visually alerting the individual of a loss of power to the structure.

2. The emergency gas line shut-off system of claim 1, wherein said control assembly additionally comprises an auxiliary power supply for providing power to said control circuitry, said auxiliary power supply being electrically connected to said control circuitry.

3. The emergency gas line shut-off system of claim 1, wherein said control assembly additionally comprises a speaker for emitting sound when said gas valve is in said closed condition.

4. The emergency gas line shut-off system of claim 1, wherein said control assembly additionally comprises a switch for turning said control circuitry between an ON condition and an OFF condition.

5. The emergency gas line shut-off system of claim 1, wherein said control assembly additionally comprises a reset switch for resetting said gas valve to an open condition where gas flows through the gas valve.

6. The emergency gas line shut-off system of claim 1, wherein said detector system additionally comprises at least one carbon monoxide detector for detecting a predetermined hazardous level of carbon monoxide, said carbon monoxide detector being mountable in the structure.

7. The emergency gas line shut-off system of claim 1, wherein said detector system additionally comprises an earthquake detector for detecting a predetermined hazardous level of ground tremors associated with an earthquake.

8. An emergency gas line shut-off system for terminating a flow of gas in a gas supply line to a structure, said assembly comprising:
    a gas valve for mounting on a gas supply, said gas valve having an open condition wherein the flow of gas is permitted to flow through said valve and into the structure and a closed condition wherein the flow of gas through said gas valve is prevented
    a central control assembly for controlling said gas valve, said assembly including control circuitry for determining when said gas valve should be in a closed condition for preventing the flow of gas; and
    a detector system for detecting a condition requiring said closed condition of said gas valve, said detector system including a smoke detector for detecting smoke, said smoke detector being electrically connected to said control circuitry;
    wherein said control assembly additionally comprises an auxiliary power supply for providing power to said control circuitry, said auxiliary power supply being electrically connected to said control circuitry;
    wherein said auxiliary power supply comprises a rechargeable battery; and
    wherein said auxiliary power supply additionally comprises a plug for electrically connecting to said rechargeable battery to recharge said rechargeable battery.

9. The emergency gas line shut-off system of claim 1, wherein said central control assembly additionally comprises:
    a housing having a back wall, a front wall, and a peripheral wall extending between said back and front walls; said control circuitry being mounted in said housing.

10. The emergency gas line shut-off system of claim 1 wherein said control assembly additionally comprises:
    a speaker for emitting sound when said gas valve is in said closed condition.

11. The emergency gas line shut-off-system of claim 1, wherein said control assembly additionally comprises:
   a switch for turning said control circuitry between an ON condition and an OFF condition.

12. The emergency gas line shut-off system of claim 1, wherein said control assembly additionally comprises:
   a first light for visually alerting an individual of said gas valve being in said closed condition.

13. The emergency gas line shut-off system of claim 12, wherein said control assembly additionally comprises:
   a second light for visually alerting the individual of a loss of power supply to the structure.

14. The emergency gas line shut-off system of claim 1, wherein said control assembly additionally comprises:
   a reset switch for resetting said gas valve to an open condition where gas flows through the gas valve.

15. The emergency gas line shut-off system of claim 1, wherein said detector system additionally comprises:
   at least one carbon monoxide detector for detecting a predetermined hazardous level of carbon monoxide.

16. The emergency gas line shut-off system of claim 1, wherein said detector system additionally comprises:
   an earthquake detector for detecting a predetermined hazardous level of ground tremors associated with an earthquake.

17. An emergency gas line shut-off system for terminating a flow of gas in a gas supply line to a structure, said system comprising:
   a gas valve for mounting on a pair of ends of the gas supply line, said gas valve having an open condition wherein the flow of gas is permitted to flow through said valve and into the structure and a closed condition wherein the flow of gas through said gas valve is prevented;
   a central control assembly for controlling said gas valve, said central control assembly being mountable in the structure, said assembly comprising:
      a housing having a back wall, a front wall, and a peripheral wall extending between said back and front walls;
      control circuitry for determining when said gas valve should be in said closed condition, said control circuitry being mounted in said housing and electrically connected to said gas valve;
      an auxiliary power supply for providing power to said control circuitry, said auxiliary power supply being mounted in said housing and electrically connected to said control circuitry, said auxiliary power supply comprising a rechargeable battery;
      a plug for electrically connecting to said auxiliary power supply to recharge said power supply;
      a speaker for emitting sound when said gas valve is in said closed condition, said speaker being mounted on said front wall of said housing and electrically connected to said control circuitry;
      a switch for turning said control circuitry between an ON condition and an OFF condition, said switch being mounted on said housing and electrically connected to said control circuitry:
      a first light for visually alerting an individual of said gas valve being in said closed condition, said first light being mounted on said front wall of said housing and positioned generally adjacent to speaker, said first light being electrically connected to said control circuitry;
      a second light for visually alerting the individual of a loss of power supply to the structure, said second light being mounted on said front wall of said housing and positioned generally adjacent to said first light, said second light being electrically connected to said control circuitry;
      a reset switch for resetting said gas valve to said open condition, said reset switch being mounted on said front wall of said housing and electrically connected to said control circuitry;
   a plurality of detectors for detecting a condition requiring said closed condition of said gas valve, each of said detectors being electrically connected to said control circuitry, said plurality of detectors comprising:
      a plurality of smoke detectors for detecting smoke, each of said smoke detectors being mountable in the structure;
      a plurality of carbon monoxide detectors for detecting a predetermined hazardous level of carbon monoxide, each of said carbon monoxide detectors being mountable in the structure;
      an earth quake detector for detecting a predetermined hazardous level of ground tremors associated with an earthquake, said earthquake detector being mountable on an outer surface of the structure; and
   wherein said gas valve is put in said closed condition when a predetermined hazardous level of one of said detectors is reached.

* * * * *